United States Patent [19]
Beaucage et al.

[11] Patent Number: 5,310,804
[45] Date of Patent: May 10, 1994

[54] PHASE SEPARATED POLYSTYRENE/POLYVINYL METHYL ETHER ALLOYS

[75] Inventors: Gregory Beaucage, Athol; Richard S. Stein, Amherst, both of Mass.

[73] Assignee: Novacor Chemicals (International) S.A., Fribourg, Switzerland

[21] Appl. No.: 895,413

[22] Filed: Jun. 5, 1992

Related U.S. Application Data

[63] Continuation-in-part of Ser. No. 522,828, May 14, 1990, abandoned.

[51] Int. Cl.$^5$ .................. C08L 25/06; C08L 29/10
[52] U.S. Cl. .................. 525/231; 525/241; 525/197; 525/198; 525/63; 525/92; 525/93; 525/94; 525/95; 525/96; 525/88; 525/132; 525/165; 525/170; 525/184; 525/189; 525/222; 525/238
[58] Field of Search .......... 525/92, 132, 148, 88, 525/231, 241, 197, 198

[56] References Cited

U.S. PATENT DOCUMENTS

| | | | |
|---|---|---|---|
| 4,172,859 | 10/1979 | Epstein | 525/109 |
| 4,174,358 | 11/1979 | Epstein | |
| 4,734,359 | 3/1988 | Oguchi et al. | 430/945 |
| 4,965,783 | 10/1990 | Jiol et al. | 369/100 |
| 5,049,619 | 9/1991 | Kyu | 525/148 |

FOREIGN PATENT DOCUMENTS 0392763 10/1990 European Pat. Off. .

OTHER PUBLICATIONS

Shaw, M. T. "Preparation of Blends", in Polymer Blends and Mixtures, D. J. Walsh, ed., Boston, Martinus Nijhoff, 1985, Chap. 4.

Voight-Martin, I. G. et al. "Kinetics of Phase Separation in Polymer Blends for Deep Quenches", *Journal of Polymer Science: Part B: Polymer Physics*, 1986, vol. 24, pp. 723–751.

Nishi, T. and T. T. Wang "Melting Point Depression and Kinetic Effects of Cooling on Crystallization in Poly(vinylidene fluoride)–Poly(methyl methacrylate) Mixtures", *Macromolecules*, 1975, vol. 8, No. 6, 909–915.

Tanaka, H. and T. Nishi "New Types of Phase Separation Behavior during the Crystallization Process in Polymer Blends with Phase Diagram", *Physical Review Letters*, 1985, vol. 55, No. 10, 1102–1105.

Paul, D. R. *Polymer Blends* New York, Academic Press, 1978, vol. 1, chap. 4.

Olabisi, O. *Polymer-Polymer Miscibility* New York, Academic Press, 1979, chap. 2.

T. Nishi et al, "Thermally Induced Phase Separation Behaviour of Compatible Polymer Mixtures" *Macromolecules* vol. 8, No. 2 Mar.–Apr. 1975 p. 227.

Primary Examiner—James J. Seidleck
Assistant Examiner—Mark L. Warzel
Attorney, Agent, or Firm—Stevens, Davis, Miller & Mosher

[57] ABSTRACT

The morphology of a polymer alloy displaying miscibility over some region of composition and temperature may be varied by thermodynamically altering the miscibility, such as raising the temperature for an LCST system, to phase separate the components then quenching the alloy below the glass transition temperature of the matrix phase. Such phase separated alloys have improved toughness.

3 Claims, 3 Drawing Sheets

IDEAL SYSTEM

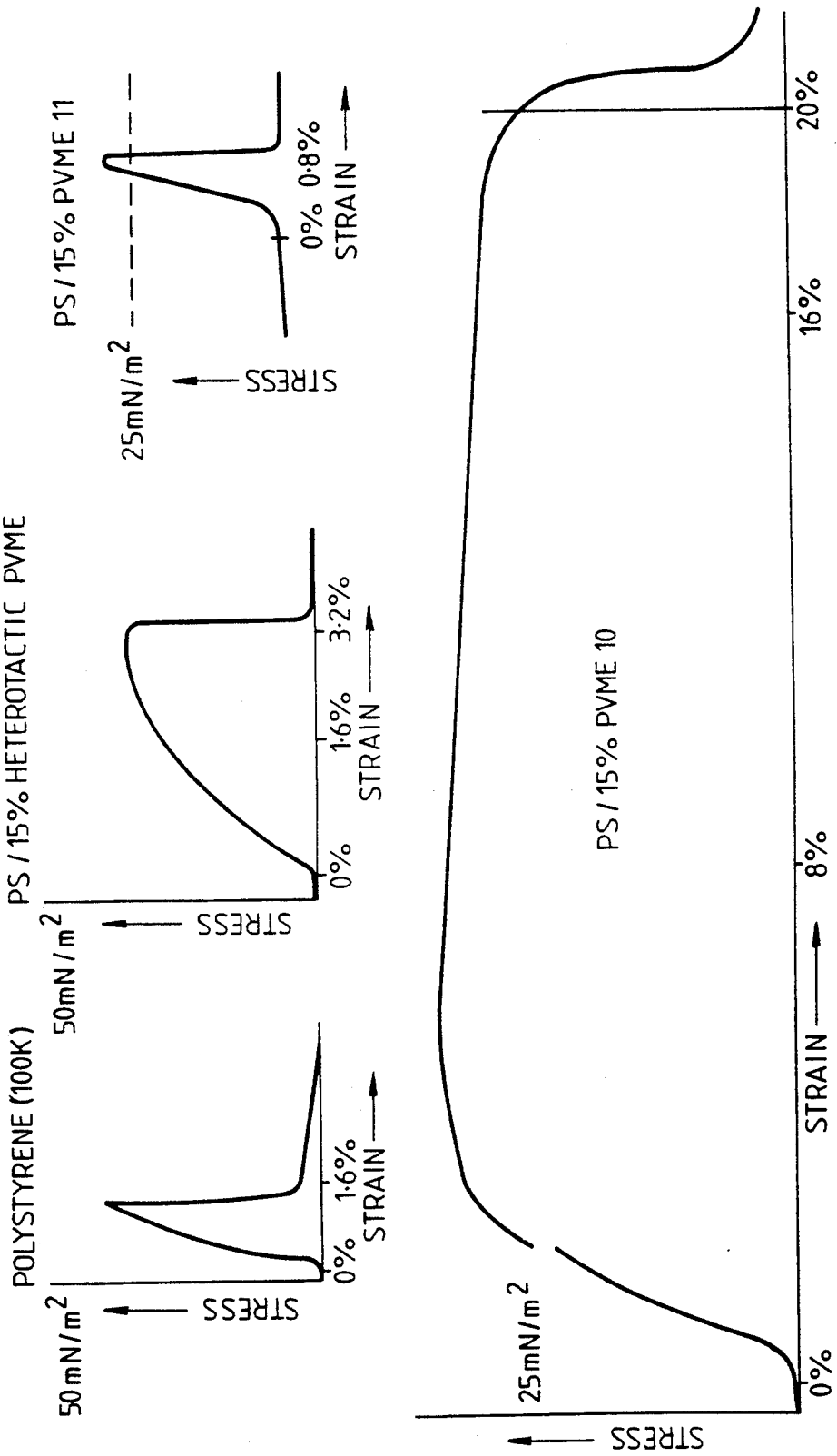

PHASE SEPARATED POLYSTYRENE/POLYVINYL METHYL ETHER ALLOYS

This application is a continuation-in-part of application Ser. No. 522,828, filed May 14, 1990 now abandoned.

FIELD OF THE INVENTION

The present invention relates to polymer alloys or polyblends which have a reduced tendency to fail in a brittle manner. More particularly, the polymer alloys of the present invention are prepared by subjecting the alloy to conditions which will cause phase separation, then quenching the alloy.

BACKGROUND OF THE INVENTION

Thermoplastic polymers, that is polymers which have a Tg above room temperature, and more preferably polymers which melt above about 100° C., have been known for a considerable length of time. Unfortunately many thermoplastic polymers tend to fail in a brittle mode; that is the polymer tends to fail due to crack propagation and there is not significant polymer deformation.

There are a number of approachs to reduce the brittleness of thermoplastics by either copolymerizing or grafting the thermoplastic polymer onto a rubbery polymer, such as high impact polystyrene (HIPS) or by blending an impact modifier in the thermoplastic polymer.

Polymer morphology is extremely important if the reduction in brittleness is to be achieved. For example in U.S. Pat. Nos. 4,172,859 and 4,174,358 polyesters or polycarbonates may be toughened by physically blending into the polyester or polycarbonate a modifier polymer which adheres (reacts) with the thermoplastic and which is distributed so that it has a particle size from 0.01 to 1.0 micron.

The manufacture of HIPS requires dissolving a rubbery polymer in a monomer which is then polymerized to form a thermoplastic polymer. Epstein teaches dispersing (not forming a miscible blend of a rubbery polymer in a thermoplastic matrix using an extruder. In both cases it is essential to control the shear exerted on the mixture of thermoplastic and rubbery polymer to obtain the required particle size distribution and morphology. According to the present invention, while shear may be commercially used to provide good mixing of the miscible components the phase separation depends on, and is caused by altering the temperature conditions.

There is another method for creating/controlling the particle size distribution within a matrix. A blend of miscible polymers may undergo thermally induced phase separation as discussed in "Thermally Induced Phase Separation Behaviour of Compatible Polymer Mixtures" T. Nishi, T. T. Wang, and T. K. Kwei Macromolecules Vol. 8 No. 2 March–April 1975 page 227. These studies have focused on the optical properties of the polymer blends. To the best of applicants knowledge this procedure has not been considered for modifying the brittleness of thermoplastic polymers. Surprisingly, applicants have discovered that the thermally induced phase separation of a blend of a thermoplastic and a rubbery polymer results in a polyblend having reduced brittleness. It is not necessary that the rubbery phase be grafted to or chemically combined with the thermoplastic polymer.

SUMMARY OF THE INVENTION

The present invention provides a polymer alloy comprising:
95 to 50 weight percent of a thermoplastic polymer which undergoes failure in a brittle mode; and
5 to 50 weight percent of rubbery coherent polymer characterized in that:
 i) the polymer alloy has a LCST or an UCST or both;
 ii) the components of the polymer alloy are miscible over a broad compositional range at temperatures above the melting temperature of the polymer having the higher Tg; and
 iii) upon subjecting the polymer alloy to temperature conditions which will cause phase separation and quenching, the quenched phase separated polymer alloy will have a yield of at least 10 percent when it is subjected to a stress of 30 $MN/M^2$.

The present invention also provides a process for preparing the above composition comprising preparing a miscible melt blend of said thermoplastic polymer which undergoes failure in a brittle mode and said rubbery coherent polymer, heating the miscible polymer blend to a temperature at which the polymers become immiscible and quenching the polymer blend to below the Tg of the thermoplastic polymer. The present invention further provides a process for preparing the above composition comprising a process for preparing the above polymer alloy comprising:
 (a) preparing a homogeneous blend of said thermoplastic polymer and said rubber polymer;
 (b) heating said blend to a temperature at which said thermoplastic and said rubbery polymer are miscible;
 (c) causing said thermoplastic polymer and said rubbery polymer to undergo phase separations with no or a minimum of shear by altering the temperature of said blend to cause spinodial phase separation and
 (d) quenching the phase separated blend over a period of time from 2 to 5 minutes to a temperature below the Tg of said thermoplastic polymer to create said phase separated polymer alloy.

The present invention also provides a process for preparing the above composition comprising mixing a solution of said thermoplastic polymer which undergoes failure in a brittle mode, with a solution of said rubbery coherent polymer, heating the resulting solution to above the lower critical solution temperature to evaporate the solvent and cause phase separation.

BRIEF DESCRIPTION OF THE DRAWINGS

FIG. 3 is a series of stress/strain diagrams for polystyrene and various polymers of vinyl methyl ether.

DESCRIPTION OF THE PREFERRED EMBODIMENTS

Figure 1:
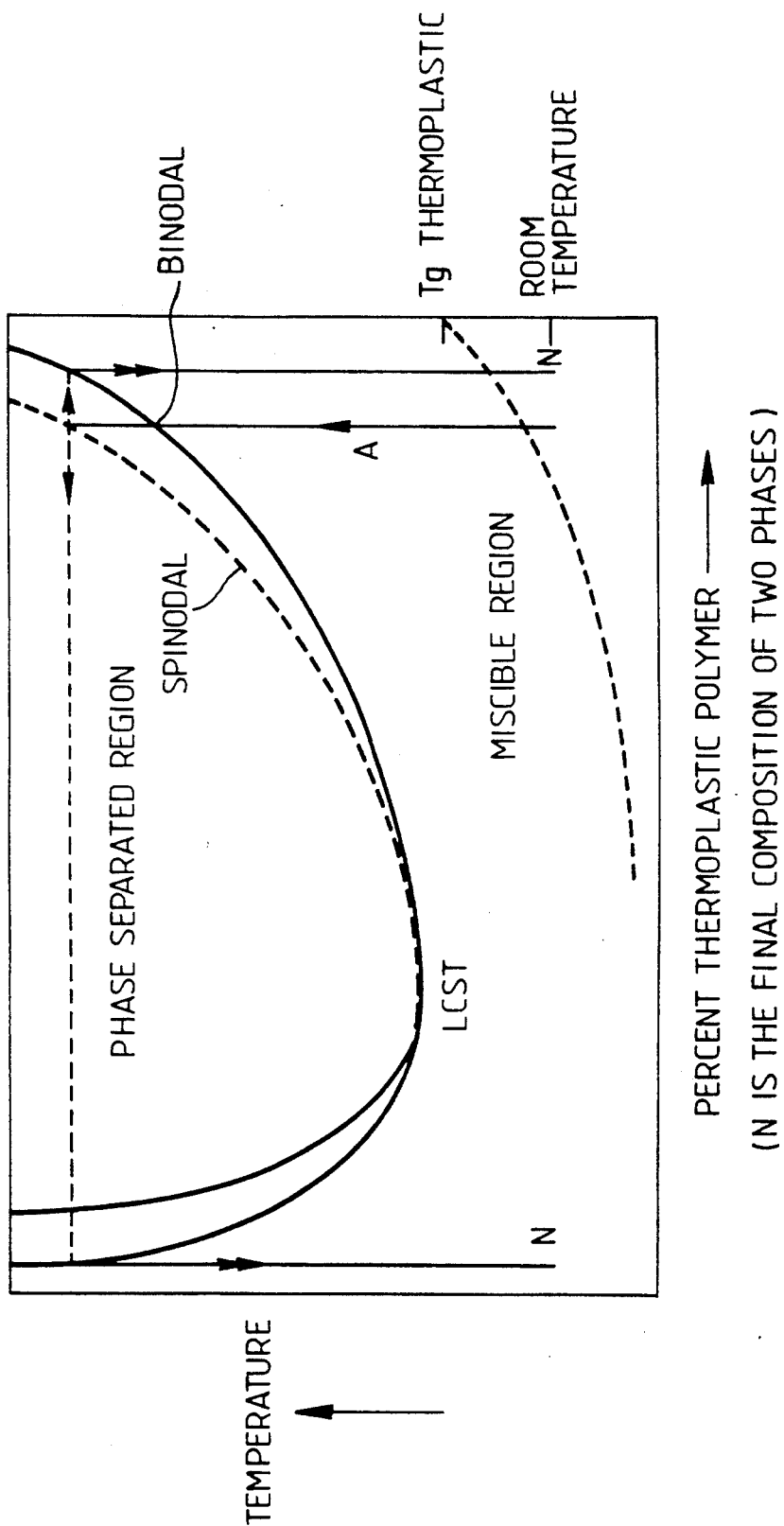
FIG. 1 is a drawing of a phase diagram of an ideal system having a LCST in accordance with the present invention.

The thermoplastic polymers which undergo failure in a brittle mode are polymers having a Tg greater than room temperature, preferably above 100° C. The polymers tend to be amorphous. The thermoplastic polymer may be selected from the group consisting of polyesters, polycarbonates, vinyl aromatic polymers, polyamides, polyimides, polyphenylene ethers, and polyphenylene sulphides.

Suitable polyesters include those derived from an alphatic diol such as a $C_{2-8}$ alkylene glycol and an aromatic dicarboxylic acid such as phthalic acid, isophthalic acid and ester deratives of such acids such as DMT. The two most common polyesters are polyethylene terephthalate and polybutylene terephthalate.

Vinyl aromatic polymers include polymers comprising:

i) from 100 to 60 weight percent of one or more $C_{8-12}$ vinyl aromatic monomers which are unsubstituted or substituted by a $C_{1-4}$ alkyl radical; and ii) from 0 to 40 weight percent of one or more monomers selected from the group consisting of:
  a) $C_{1-4}$ alkyl esters of $C_{3-6}$ ethylenically unsaturated carboxylic acids; and
  b) $C_{3-8}$ alkenyl nitriles.

Polycarbonates are derived from polyhydroxy aromatic compounds such as resorcinol or bisphenol A. These starting compounds may be further substituted by chlorine or bromine atoms to enhance the flame retardance of the final polycarbonate. The polycarbonate may be produced by the reaction of the starting polyhydroxy aromatic compound with phosgene.

The thermoplastic may be a polyphenylene ether (sometimes called polphenylene oxides). These compounds are produced by the oxidative coupling (polymerization) of phenol based compounds. For example the most common polyphenylene ether (poly 2,6-dimethyl-1,4 phenylene oxide) is produced from 2,6-dimethylphenol. As with the polycarbonates the aromatic ring may further contain chlorine or bromine atoms to enhance the flame retardant properties of the polymer.

The thermoplastic may be a polyphenylene sulphide. These materials are produced by the reaction of a dihalo (preferably chloro) benzene with a reactive sulfide, such as sodium sulfide in a polar solvent.

Preferably the thermoplastic is a styrenic polymer such as polystyrene, a styrene acrylonitrile copolymer (SAN) or a styrene acrylate such as a copolymer of styrene and one or more of methyl methacrylate, ethyl acrylate, or butyl acrylate. Generally the styrene will be present in the polymer in an amount of at least 60 percent by weight. While the term styrene has been used above, one skilled in the art will understand that all or part of the styrene may be replaced with styrene homologues such as alpha methyl styrene and paramethylstyrene.

Generally, the polymer alloy will comprise from 95 to 50, preferably 90 to 60 weight percent of the thermoplastic and the balance, from 5 to 50 preferably from 10 to 40 weight percent of the rubbery coherent polymer.

The rubbery coherent polymer, which is used in accordance with the present invention preferably will have a Tg below 0° C., most preferably below −20° C. The rubbery polymer is coherent. That is it has a certain amount of integrity. This integrity may be provided in a number of manners. The polymer may be chemically crosslinked. However, if the rubbery polymer is chemically crosslinked the crosslink density should not be so high as to prevent the rubbery polymer from becoming miscible in the thermoplastic polymer. Generally, the rubbery polymer should have a very low level of gel or most preferably no gel. Preferably the chemical crosslinking is labile as in the case of hydrogen bonding such as in carboxylated polymers such as a copolymer of butyl acrylate and (meth)acrylic acid or as in an ionomer bonded through a metal ion.

The rubber polymer may be coherent due to polymer chain entanglements such as in unvulcanized rubber.

The rubbery polymer may be coherent due to the presence of crystallinity. Preferably the polymer will have a low degree of crystallinity from about 1 to 20, preferably from about 3 to 10 percent as measured using X-ray diffraction. To promote crystallinity the rubbery polymer may be stereo regular. That is it may be syndiotactic, or isotactic.

A particularly useful class of rubbery polymers are the polyvinyl $C_{1-4}$ alkyl ethers. A most useful rubbery polymer is isotactic or heterotactic polyvinyl methyl ether (pvme). However, one should also consider other steroregular polymers such as natural rubber and/or cis- polybutadiene.

The coherent rubbery polymer may also be a block copolymer such as an A-B or an A-B-A block copolymer. The block copolymer may contain one or more stereoregular blocks such as isotactic pvme. The block copolymer itself may display microphase separation. That is, one or more of the blocks may become miscible with the thermoplastic while the other block is not miscible in or only slightly soluble in the thermoplastic.

The rubbery coherent polymer may have a molecular weight from 20,000 to 175,000. If the rubbery coherent polymer is not a block copolymer preferably it will have a molecular weight from about 20,000 to 80,000 most preferably from about 20,000 to 60,000. If the rubbery coherent polymer is a block copolymer preferably it will have a molecular weight from about 70,000 to 150,000 most preferably from about 70,000 to 100,000.

In practicing the present invention the thermoplastic and the rubbery coherent polymer are selected so that the blend will exhibit a Lower Critical Solution Temperature (LCST), an Upper Critical Solution Temperature (UCST), or both; and the components of the polymer alloy are miscible above the melting temperature of the polymer having the higher Tg. The polymer miscibility and the compositional range over which the polymers remain miscible may be determined using noninventive experimentation following the procedures outlined by T. Nishi, T. T. Wang, and T. K. Kwei referred to above. The text of which is herein incorporated by reference.

A critical feature of the present invention is that if the polymer alloy is subjected to conditions, which will cause phase separation, typically by heating above the LCST, and then quenched, the resulting quenched polymer alloy must have a yield of greater than 10 percent under a stress of 30 $MN/M^2$.

In practice the alloys of the present invention may be prepared or partially prepared by either extrusion techniques or solvent blending.

The thermoplastic and rubbery coherent polymers may be dry blended (e.g. using a tumble blender). The dry blend is fed into an extruder which operates in the range of polymer miscibility. The extrudate may then be chopped into pellets for further processing, or molded and further treated to cause phase separation and quenching. Practically, in an injection molding process the later zones in the molder would be operated above the UCST while the mold would be chilled below the Tg for the thermoplastic. In a sheet forming operation chiller rolls could be used to quench the sheet.

In an alternate process a solution of the thermoplastic and a solution of the rubbery coherent polymer are blended to produce the required ratio of thermoplastic to rubbery polymer. The solution is heated to drive off the solvent and then the resulting blend is heated to cause phase separation, then quenched.

As noted above the rubbery polymer should have a Tg less than 0° C., preferably less than −20° C. The thermoplastic will typically have a melting temperature of about 100° C. or greater. Thus the first part of the treatment will generally be at temperature between 100° C. and the LCST (or UCST). Then the blend is quenched.

Without wishing to be bound by theory the process of the present invention will be described in association with FIG. 1 which is a phase digram of an ideal system of the present invention. Starting with an alloy rich in thermoplastic (the second from the right of the figure) the alloy is heated. When the temperature reaches the dark LCST line it first undergoes spinodal separation (e.g. forms a periodic and interconnected structure) then a binodal separation (discrete spherical phases).

At this stage, the alloy phase separates into a more rich thermoplastic phase which has a composition where the horizontal temperature line intersects the right side of the LCST line and a rubber rich separated phase having a composition where the horizontal temperature line intersects the left side of the LCST line. Thus by controlling the temperature it is possible to control the compositions of both the matrix phase and the discrete separated phase. The alloy is then quenched, in about 2-5 minutes. The rate of locking in of the particle structure will be determined by the temperature the alloy is above the Tg of the thermoplastic polymer. Additionally it should be noted that by controlling the temperature conditions it is also possible to control the structure of the separated phase. Thus, if a spinodal structure is desired the alloy would be heated in the temperature range where spinodal decomposition or phase separation occurs, and then the alloy would be quenched.

Figure 2:
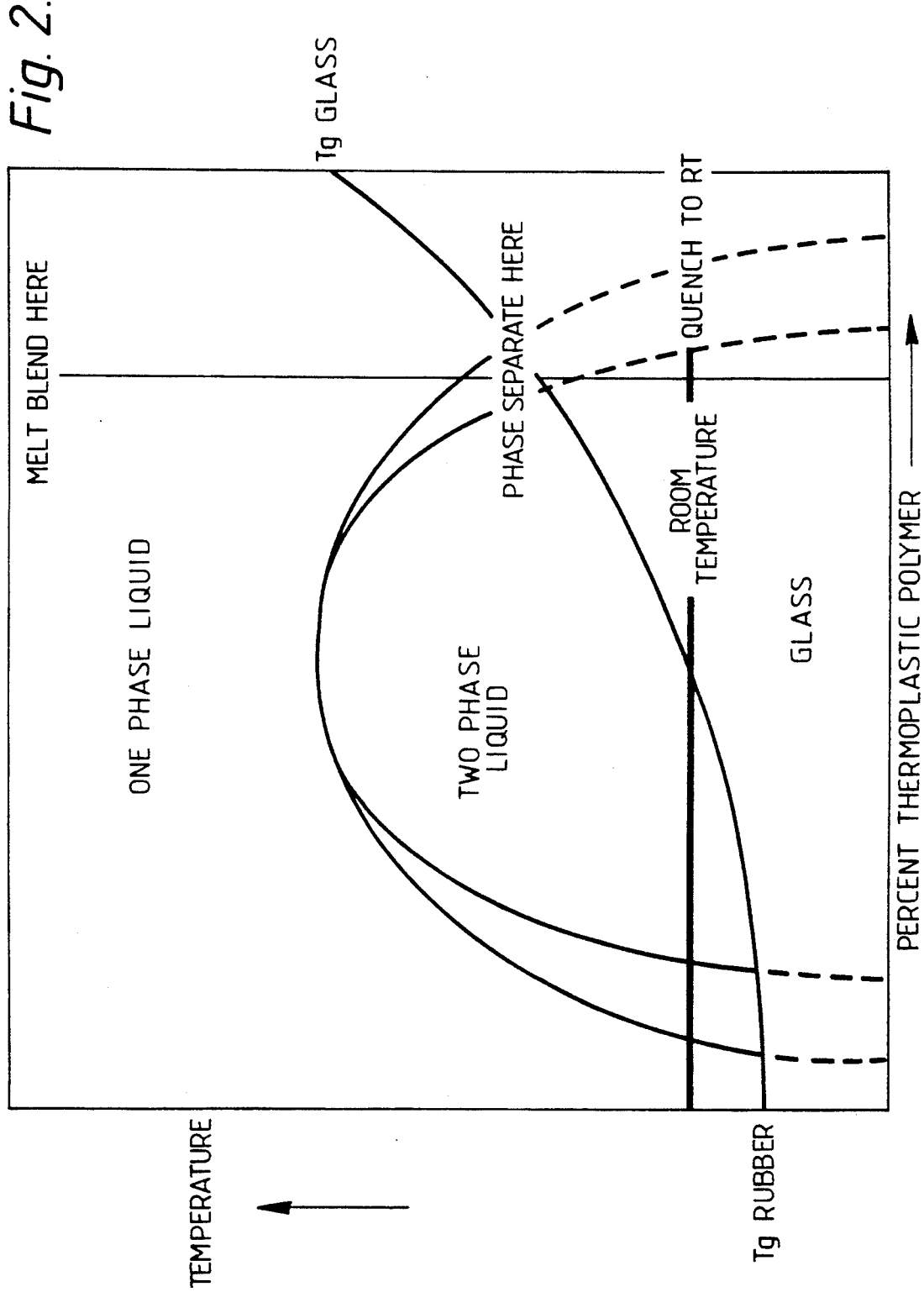
FIG. 2 is a drawing of a phase diagram of an ideal system having a UCST in accordance with the present invention.

FIG. 2 is a phase diagram for a system having a UCST in accordance with the present invention. Starting with an alloy rich in thermoplastic (at the right of the phase diagram); the alloy is heated above the Tg of the blend to a phase separated liquid. This results in a thermoplastic rich liquid phase and a rubbery rich liquid phase. The liquid is quenched to room temperature or below the melting point of each component. This results in a plastic rich continuous phase and a rubbery rich discontinuous phase.

It is believed that the particle size of the discontinuous phase may be up to about 10 microns.

While the present invention has been discussed in association with a two component alloy it is believed that the system would be useful with more than two components, provided the thermoplastic components have a similar melting temperature and that the melt of thermoplastic and rubbery components is miscible.

The present invention will be illustrated by the following examples in which parts are parts by weight (e.g. g)

EXAMPLE 1 Preparation of Isotactic Polyvinyl Methyl Ether

Vinyl methyl ether gas from Matheson Gas Products was dissolved in a mixed solvent to provide a ratio of 25 parts by weight monomer per 100 parts by weight solvent. A catalyst $BF_3O(Et)_2$ was added in an amount of 0.4 ml per 100 g of monomer solution. The monomer solution was kept at about −75° C. and under a nitrogen atmosphere for 2 hours. The reaction was terminated with $NH_3$/MEOH. The product was dried in a rotovac and stored at room temperature under vacuum for 3 days.

By controlling the polarity of the mixed solvent and using low catalyst levels it was possible to control the isotacticity of the polymer. Generally less polar solvent and lower catalyst concentration increased isotacticity.

Two different types of isotactic polyvinyl methyl ether (i-PVME) were prepared in this manner. The molecular weight and the MW/Mn, Tg, Tm and crystallinity of the samples were determined. For convenience the samples are identified as i-PVME 10 and i-PVME 11. Similar data was determined for a commercially obtained heterotactic PVME. The data is presented in Table I.

TABLE I

| PVME | MW | Mw/Mn | Tg | Tm | Crystallinity (X-ray) |
|---|---|---|---|---|---|
| Heterotactic | 69k | 3 | −22.3° C. | — | 0 |
| i-PVME 10 | 27k | 5 | −22.3° C. | 30.5 | 3.% |
| i-PVME 11 | 24k | 5 | −20.3° C. | 35.2[1] 59.3 | 9.2% |

[1]Two peaks observed by DSC.

EXAMPLE 2

A series of films of polymers or alloys were cast from various polymers or polymer blends dissolved in toluene. In the experiment polystyrene having a molecular weight of 100,000, and a blend of 85 weight percent polystyrene having a molecular weight of 100,000 and 15 percent of:
 i) heterotactic polyvinyl methyl ether
 ii) i-PVME 10; and
 iii) i-PVME 11
were cast from a solution to give a film 25 um thick. The film was cut into test sections 50 mm by 5 mm. The samples were tested using ASTM procedure D882 at a strain rate of 10 mm/min. The stress/strain plots for the samples and for polystyrene (PS) are shown in FIG. 3. The stress/strain plot for polystyrene shows a failure in a brittle mode. The stress/strain plot for the polystyrene-heterotactic polyvinyl methyl ether alloys shows some yield (about 3.2%) then failure. The stress/strain plot for the polystyrene-i-PVME 11 shows failure in a brittle mode and a very low yield. The stress/strain curve for polystyrene-i-PVME 10 shows yield.

What is claimed is:

1. A process for preparing a two-phase polymer alloy comprising:
 (a) from 90 to 60 weight % of polystyrene; and
 (b) from 10 to 40 weight % of polyvinyl methyl ether having a molecular weight from 20,000 to 60,000 which is miscible in said polystyrene at temperatures above the melting temperature of the polystyrene and which polyvinyl methyl ether has a degree of crystallinity of about 3% as measured by X-ray diffraction;
said alloy characterized in that:
(i) it has a LCST or a UCST, or both;
(ii) the components of the polymer alloy are miscible over a composition range of polystyrene: polyvinyl methyl ether from 90:10 to 60:40 weight percent at temperatures above the melting temperature of the polymer having the higher Tg; and
(iii) upon subjecting the polymer alloy to temperature conditions which will cause phase separation and quenching, the quenched phase separated polymer alloy will have a yield of at least 10% when subjected to a stress of 30 MN/M$^2$;
which process comprises:
(A) preparing a homogeneous blend of said polystyrene and said polyvinyl methyl ether by extruding a dry blend of said polystyrene and said polyvinyl methyl ether at a temperature to form a homogeneous alloy;
(B) heating said blend to a temperature at which said polystyrene and said polyvinyl methyl ether are miscible;
(C) causing said polystyrene and said polyvinyl methyl ether to undergo phase separation with no or a minimum of shear by altering the temperature of said blend to cause spinodal phase separation; and
(D) quenching the phase separated blend over a period of time from 2 to 5 minutes to a temperature below the Tg of said polystyrene to create said phase separated polymer alloy.

2. The process according to claim 1, wherein said temperature at which said polystyrene and polyvinyl methyl ether become miscible is above the lower critical solution temperature.

3. The process according to claim 1, wherein said temperature at which said polystyrene and polyvinyl methyl ether become miscible is below the upper critical solution temperature.

* * * * *